United States Patent
Kong et al.

(10) Patent No.: US 10,026,429 B2
(45) Date of Patent: Jul. 17, 2018

(54) PERPENDICULAR MAGNETIC RECORDING MEDIUM

(75) Inventors: Sok-hyun Kong, Seoul (KR); Hoo-san Lee, Osan-si (KR); Sadayuki Watanabe, Tokyo (JP); Shunji Takenoiri, Tokyo (JP)

(73) Assignee: Seagate Technology LLC, Cupertino, CA (US)

( * ) Notice: Subject to any disclaimer, the term of this patent is extended or adjusted under 35 U.S.C. 154(b) by 407 days.

(21) Appl. No.: 12/722,581

(22) Filed: Mar. 12, 2010

(65) Prior Publication Data

US 2010/0233515 A1 Sep. 16, 2010

(30) Foreign Application Priority Data

Mar. 13, 2009 (KR) .................. 10-2009-0021882

(51) Int. Cl.
*G11B 5/66* (2006.01)

(52) U.S. Cl.
CPC ..................................... *G11B 5/66* (2013.01)

(58) Field of Classification Search
CPC ....................................................... G11B 5/66
USPC .................... 428/828, 828.1, 829, 836.2
See application file for complete search history.

(56) References Cited

U.S. PATENT DOCUMENTS

| | | | |
|---|---|---|---|
| 6,447,936 B1 * | 9/2002 | Futamoto et al. | 428/827 |
| 6,610,424 B1 * | 8/2003 | Acharya et al. | 428/830 |
| 7,901,801 B2 | 3/2011 | Oikawa et al. | |
| 2003/0236646 A1 | 12/2003 | Suzuki | |
| 2004/0013910 A1 * | 1/2004 | Acharya et al. | 428/694 ST |
| 2004/0091748 A1 | 5/2004 | Kamata et al. | |
| 2006/0147759 A1 * | 7/2006 | Lee et al. | 428/830 |
| 2006/0204791 A1 * | 9/2006 | Sakawaki et al. | 428/828.1 |
| 2006/0222901 A1 | 10/2006 | Inamura et al. | |

(Continued)

FOREIGN PATENT DOCUMENTS

| JP | 04155618 A | 5/1992 |
|---|---|---|
| JP | 05205257 A | 8/1993 |

(Continued)

OTHER PUBLICATIONS

Response to Office Action Under 37 CFR 1.111 filed Sep. 22, 2010 for U.S. Appl. No. 12/166,592, filed Jul. 2, 2008, Soichi Oikawa, et al., now U.S. Pat. No. 7,901,801 dated Mar. 8, 2011 and electronic acknowledgment from the USPTO dated Sep. 22, 2010. (of particularly note, see pp. 2 and 7 of the Response to Office Action).

*Primary Examiner* — Holly Rickman
*Assistant Examiner* — Lisa Chau
(74) *Attorney, Agent, or Firm* — Hall Estill Attorneys at Law

(57) ABSTRACT

A perpendicular type of magnetic recording medium has a multi-layered recording structure made up of a plurality of ferro-magnetic layers and a non-magnetic layer interposed between the plurality of ferro-magnetic layers, and the perpendicular magnetic anisotropy energy of the lower ferro-magnetic layer is greater than the perpendicular magnetic anisotropy energy of the upper ferro-magnetic layer. Accordingly, the lower ferro-magnetic layer may be easily magnetically reversed by a magnetic field applied during a write operation. Thus, the perpendicular type of magnetic recording medium exhibits an enhanced thermal stability and write-ability.

15 Claims, 3 Drawing Sheets

(56) References Cited

U.S. PATENT DOCUMENTS

| | | | |
|---|---|---|---|
| 2006/0222905 | A1 | 10/2006 | Yasui et al. |
| 2007/0026262 | A1 | 2/2007 | Maeda |
| 2007/0231609 | A1* | 10/2007 | Ajan et al. ................. 428/828.1 |
| 2007/0292720 | A1* | 12/2007 | Suess ......................... 428/828.1 |
| 2008/0180843 | A1* | 7/2008 | Zhang et al. ................. 360/135 |
| 2009/0011281 | A1* | 1/2009 | Oikawa et al. ............... 428/812 |

FOREIGN PATENT DOCUMENTS

| | | |
|---|---|---|
| JP | 2003-059024 | 2/2003 |
| JP | 2004272982 A | 9/2004 |
| JP | 2009-015959 A | 1/2009 |
| KR | 1020020087362 A | 11/2002 |
| KR | 2003-0051884 | 6/2003 |
| KR | 1020040025430 A | 3/2004 |
| KR | 1020040033492 A | 4/2004 |
| KR | 2007-0098425 | 6/2008 |

\* cited by examiner

PERPENDICULAR MAGNETIC RECORDING MEDIUM

PRIORITY STATEMENT

This application claims the benefit of Korean Patent Application No. 10-2009-0021882, filed on Mar. 13, 2009, in the Korean Intellectual Property Office.

BACKGROUND

The inventive concept relates to magnetic recording media. More particularly, the inventive concept relates to a perpendicular magnetic recording medium in which the direction of magnetization of bits of recorded data is perpendicular to the surface of a magnetic layer.

The amount of information or data that must be processed by today's electronic devices is forever rapidly increasing. Accordingly, the data must be recorded (stored) with a high-density and the data must be capable of being recorded/reproduced at a rapid rate. In this regard, magnetic recording devices have characteristics such as large storage capacity and fast access time. Accordingly, magnetic recording devices are being widely used as information memory devices by various digital devices, as well as by computers. These magnetic recording devices employ a magnetic recording medium to record (store) data. Magnetic recording media have a number of tracks along which data is recorded, and bits of data are recorded along each of the tracks.

A magnetic recording medium of a magnetic recording device may be of a longitudinal magnetic recording type or a perpendicular magnetic recording type according to the way in which the medium records (stores) data. In a longitudinal type of magnetic recording medium, the direction of magnetization of bits of recorded data is parallel to a surface of a magnetic layer. In a perpendicular type of magnetic recording medium, the direction of magnetization of bits of recorded data is perpendicular to the surface of the magnetic layer. Data can be recorded with a higher recording density on a perpendicular type of magnetic recording medium than on a longitudinal type of magnetic recording medium.

A conventional perpendicular type of magnetic recording medium includes a soft magnetic underlayer, a recording layer, and a passivation layer. In order to maximize the recording density of a perpendicular type of magnetic recording medium, it is necessary to minimize the width of the tracks and to minimize the number of bits which can be recorded along a unit length of each track. To these ends, the recording layer must have a small grain size. Meanwhile, the smaller the grain size of the recording layer, the higher the perpendicular magnetic anisotropy energy (Ku) of the material forming the recording layer must be if the recording layer is to remain thermally stable. However, it is generally known that a coercive force of the recording layer becomes greater the higher the perpendicular magnetic anisotropy energy (Ku) becomes. Also, it is generally known that as the grain size of the recording layer becomes smaller the saturated magnetization (Ms) of the material forming the recording layer has to be increased to assure a necessary data reproduction output. Also, it is generally known that it is very difficult to produce a recording layer having uniform magnetic characteristics because the magnetic characteristics of the recording layer vary according to the size of the grains of the recording layer and it is very difficult to produce a recording layer having grains of the same size.

SUMMARY

According to an aspect of the inventive concept, there is provided a perpendicular magnetic recording medium including a substrate, a section of soft magnetic material in layer form on the substrate, and a recording section disposed above the section of soft magnetic material and comprising a plurality of ferro-magnetic layers and a non-magnetic layer interposed between respective ones of the plurality of ferro-magnetic layers.

BRIEF DESCRIPTION OF THE DRAWINGS

The inventive concept will be more clearly understood from the following detailed description of preferred embodiments thereof made in conjunction with the accompanying drawings in which.

DETAILED DESCRIPTION OF THE PREFERRED EMBODIMENTS

Figure 1:
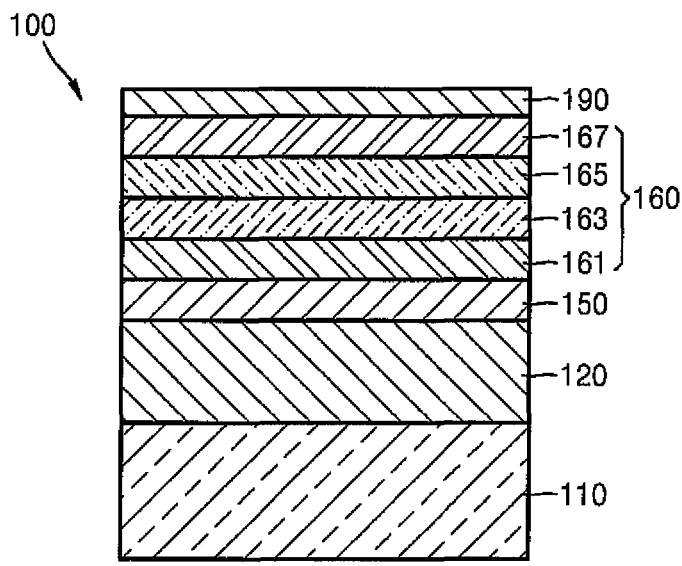
FIG. 1 is a cross-sectional view of an embodiment of a perpendicular type of magnetic recording medium according to the inventive concept.

The inventive concept will now be described more fully with reference to the accompanying drawings. In the drawings, the thicknesses of layers and regions may be exaggerated for clarity. Furthermore, like reference numerals denote like elements throughout the drawings.

Referring to FIG. 1, one example of a perpendicular type of magnetic recording medium 100 according to the inventive concept includes a substrate 110, a soft magnetic material section 120, an intermediate section 150, a recording section 160, and a passivation layer 190 that are stacked one atop the other in the foregoing order.

The substrate 110 may be of the same material that is used to form the substrate of a conventional perpendicular type of magnetic recording medium. For example, the substrate 110 may be of glass, MgO, AlMg, Si, and the like. Also, the substrate 110 may be circular.

The soft magnetic material section 120 attracts the magnetic field generated by a recording head during a magnetic recording operation so as to form a magnetic path perpendicular to the plane of the recording section 160, and may consist of a single layer of material or may comprise several layers of material. The soft magnetic material section 120 may also be of the same material that is used to form a soft magnetic underlayer of a conventional perpendicular magnetic type of recording medium. For example, the soft magnetic material section 120 may comprise a soft magnetic material having a Co-based amorphous structure, or an Fe- or Ni-based material.

The soft magnetic material section 120 may be formed by being grown on the substrate 110 using a seed layer (not shown) of Ta or a Ta alloy. In this respect, the seed layer is interposed between the substrate 110 and the resulting soft magnetic material section 120. Also, a buffer layer (not shown) or a magnetic domain control layer (not shown) may be interposed between the substrate 110 and the soft magnetic material section 120. Such a buffer layer is well known in the art, per se, and thus will not be described in detail.

The recording section 160 is the section of the medium 100 at which magnetic information is recorded, and includes a plurality of ferro-magnetic layers, and a non-magnetic layer 163 interposed between respective ones of the ferro-magnetic layers. Thus, at least one of the ferro-magnetic layers is magnetically isolated from at least one other of the ferro-magnetic layers by the non-magnetic layer.

For purposes of description, the term "upper" will reference proximity toward that side of the perpendicular type of magnetic recording medium 100 at which the passivation layer 190 is disposed, whereas the term "lower" will reference proximity toward that side of the perpendicular type of magnetic recording medium 100 at which the substrate 110 is located. The ferro-magnetic layers include a lower ferro-magnetic layer 161, a middle ferro-magnetic layer 165, and an upper ferro-magnetic layer 167. In one example of the embodiment of FIG. 1, each of the ferro-magentic layers is of a Co alloy or a Co alloy oxide. Alternatively, the ferro-magnetic layers may each be formed of a FePt alloy-based material. Also, although the recording section 160 of the present embodiment has a four-layered structure consisting of three ferro-magnetic layers and one non-magnetic layer, the recording layer may have a structure including more than four layers.

The lower ferro-magnetic layer 161 has a perpendicular magnetic anisotropy energy (Ku) of $5 \sim 50 \times 10^6$ erg/cc to ensure that it has sufficient thermal stability. Furthermore, the lower ferro-magnetic layer 161 has a saturated magnetization (Ms) greater than 500 emu/cc to ensure that an output of the perpendicular type of magnetic recording medium 100 remains sufficient (i.e., great enough to allow magnetic data to be recorded/reproduced on/from the recording section using a conventional magnetic head) even if the magnetic grains of the recording section 160 are relatively small (described later). In this regard, the perpendicular magnetic anisotropy energy (Ku) and the saturated magnetization (Ms) are designed for based on the size of the magnetic grains of the recording section 160. For example, when the magnetic grain size (average diameter of the grains) is equal to or less than 6 nm, the lower ferro-magnetic layer 161 is composed to have a perpendicular magnetic anisotropy energy (Ku) of $5 \sim 50 \times 10^6$ erg/cc and a saturated magnetization (Ms) greater than 500 emu/cc. The selection of the composition of the ferro-magnetic layer 161 to achieve the characteristics described above will now be described below with reference to FIGS. 2 and 3.

Figure 2:
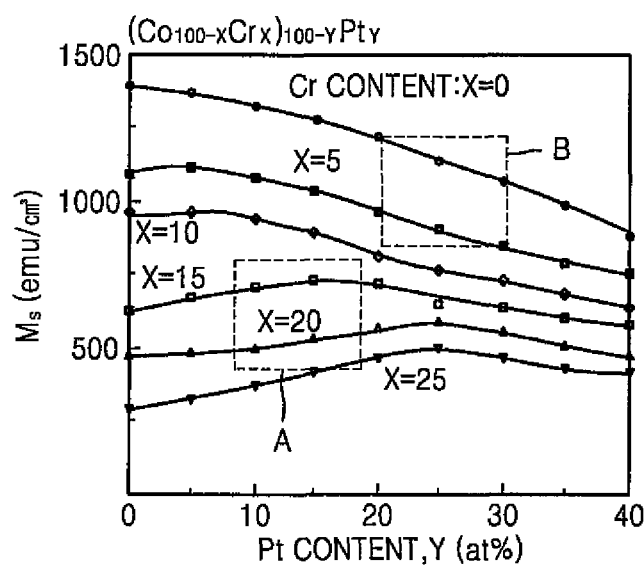
FIG. 2 is a graph of saturated magnetization (Ms) with respect to variation of contents of a recording layer.
Figure 3:
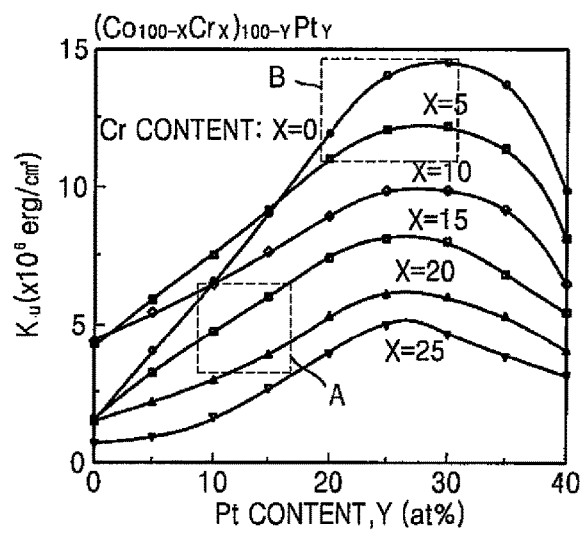
FIG. 3 is a graph of perpendicular magnetic anisotropy energy (Ku) with respect to variation of contents of a recording layer.

FIGS. 2 and 3 are graphs of saturated magnetization (Ms) and perpendicular magnetic anisotropy energy (Ku), respectively, for different compositions of a ferro-magnetic layer of a $(Co_{100-X}Cr_X)_{100-Y}Pt_Y$ alloy or a $(Co_{100-X}Cr_X)_{100-Y}Pt_Y$ alloy oxide satisfying the relationships $0 \leq X \leq 20$ and $20 \leq Y \leq 30$.

Referring to FIGS. 2 and 3, it is apparent that the perpendicular magnetic anisotropy energy (Ku) increases as the Pt content of the composition increases, and the saturated magnetization (Ms) and the perpendicular magnetic anisotropy energy (Ku) decrease as the Cr content increases.

It is generally known that in perpendicular type of magnetic recording media whose magnetic layers have a magnetic size greater than 10 nm, the magnetic layers have sufficient thermal stability (remain magnetized over an appropriate range of temperatures) and an output sufficient to allow recording/reproduction with a typical magnetic head as long as the magnetic layers have a perpendicular magnetic anisotropy energy (Ku) of $3 \sim 5 \times 10^6$ erg/cc and a saturated magnetization (Ms) of about 500 emu/cc. Area A in each of FIGS. 2 and 3 shows the range of compositions which have a saturated magnetization (Ms) and perpendicular magnetic anisotropy energy (Ku) that facilitate the recording/reproduction of magnetic data on/from a layer thereof using a typical magnetic head.

On the other hand, the recording section 160 of the embodiment of the perpendicular type of magnetic recording medium of FIG. 1 has a saturated magnetization (Ms) equal to or greater than 500 emu/cc and a perpendicular magnetic anisotropy energy (Ku) equal to or greater than $5 \times 10^6$ erg/cc so that the recording medium 100 has thermal stability and a sufficient output even when the magnetic grain size is equal to or smaller than 9 nm. Preferably, the recording section 160 has a saturated magnetization (Ms) equal to or greater than 1000 emu/cc and a perpendicular magnetic anisotropy energy (Ku) equal to or greater than $9 \times 10^6$ erg/cc so that the recording medium 100 has thermal stability and a sufficient output even when the magnetic grain size is about 6 nm.

Referring to FIGS. 2 and 3, area B shows the range of compositions over which the saturated magnetization (Ms) is equal to or greater than 1000 emu/cc and the perpendicular magnetic anisotropy energy (Ku) is equal to or greater than $9 \times 10^6$ erg/cc. In order to obtain these values for the saturated magnetization (Ms) and the perpendicular magnetic anisotropy energy (Ku), contents Co, Cr, and Pt in a $(Co_{100-X}Cr_X)_{100-Y}Pt_Y$ alloy or a $(Co_{100-X}Cr_X)_{100-Y}Pt_Y$ alloy oxide for forming the magnetic recording medium 100 satisfy the relationships $0 \leq X \leq 5$ and $20 \leq Y \leq 30$. For example, with respect to a CoCrPt magnetic composite, if the Cr content is zero and the Pt content is between 20 at. % and 30 at. %, the perpendicular magnetic anisotropy energy (Ku) of the magnetic composite is about $1.5 \times 10^7$ erg/cc.

However, the higher the perpendicular magnetic anisotropy energy (Ku), the greater is the coercive force Hc of the lower ferro-magnetic layer 161. The greater the coercive force Hc, the greater is the magnetic force required for magnetization reversal. That is, larger writing magnetic fields for recording are required when the coercive force Hc is greater. In the embodiment of FIG. 1, though, the middle ferro-magnetic layer 165 is disposed above the lower ferro-magnetic layer 161 in the recording section 160 and is provided with a relatively low perpendicular magnetic anisotropy energy (Ku). Therefore, the magnetization of the lower ferro-magnetic layer 161 may be easily reversed.

For example, the middle ferro-magnetic layer 165 is formed of a CoCrPt alloy or a CoCrPt alloy oxide whose composition is determined such that the perpendicular magnetic anisotropy energy (Ku) of the middle ferro-magnetic layer 165 is lower than the perpendicular magnetic anisotropy energy (Ku) of the lower ferro-magnetic layer 161. For example, the middle ferro-magnetic layer 165 is composed so as to have a perpendicular magnetic anisotropy energy (Ku) of $3 \sim 5 \times 10^6$ erg/cc; accordingly, a conventional recording head may be used for recording magnetic data on the middle ferro-magnetic layer 165

The lower ferro-magnetic layer 161 and the middle ferro-magnetic layer 165 each have a granular structure comprising a plurality of magnetic grains. Furthermore, the lower ferro-magnetic layer 161 and the middle ferro-magnetic layer 165 may each have a granular structure comprising a plurality of magnetic grains and a non-magnetic material separating the plurality of magnetic grains from one another. For example, the lower ferro-magnetic layer 161 and the middle ferro-magnetic layer 165 may each be a layer of a Co-alloy oxide, in which magnetic grains of the Co-alloy are surrounded by the oxide so as to be magnetically isolated.

Referring again to FIG. 1, the non-magnetic layer 163 is interposed between the lower ferro-magnetic layer 161 and the middle ferro-magnetic layer 165 so as to magnetically separate the lower ferro-magnetic layer 161 from the middle ferro-magnetic layer 165 and the upper ferro-magnetic layer 167. To this end, the non-magnetic layer 163 may be formed of Ru or an Ru alloy, and may have a thickness between 0.2 nm and 1.0 nm.

Figure 4:
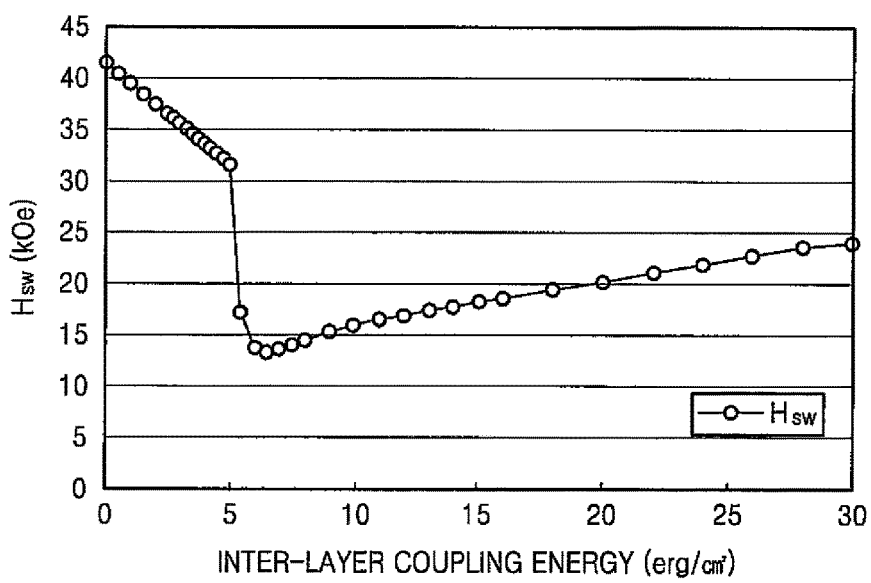
FIG. 4 is a graph showing variation of a magnetization-reversal field (Hsw) and associated inter-layer coupling energy between an upper ferro-magnetic layer and a lower ferro-magnetic layer for cases in which Ru non-magnetic layers of different thicknesses are each interposed between the upper ferro-magnetic layer and the lower ferro-magnetic layer.

FIG. 4 shows magnetization-reversal field (Hsw) and inter-layer coupling energy values between an upper ferro-magnetic layer and a lower ferro-magnetic layer when Ru non-magnetic layers of different thicknesses are each interposed between the upper ferro-magnetic layer and the lower ferro-magnetic layer. Up to a certain extent, the magnetization-reversal field (Hsw) decreases as the inter-layer coupling energy increases. In this range, the lowest inter-layer coupling energy of 5~10 erg/cm$^2$ in FIG. 4 is provided when the Ru non-magnetic layer has a thickness between 0.5 nm and 0.8 nm.

The upper ferro-magnetic layer 167 functions to enhance the write-ability, and to this end may be formed of a non-oxygen Co-alloy such as CoCrPtB. That is, the upper ferro-magnetic layer 167 may be a thin film of contiguous magnetic grains (grains that are not separated such as by an oxide). Also, the upper ferro-magnetic layer 167 may be formed to have a saturated magnetization (Ms) higher than that of the middle ferro-magnetic layer 165 so as to ensure a sufficient output even if the magnetic grain size is relatively small.

The intermediate section 150 increases the crystallographic orientation and a magnetic characteristic of the recording section 160, and is arranged under the recording section 160. That is, the intermediate section 150 is formed of material selected according to the material and crystalline structure of the recording section 160. In this regard, the intermediate section 150 may consist of a single layer of material or may have a multi-layered structure wherein each at least one layer is of material selected from the group consisting of Ru, an Ru oxide, MgO, and Ni.

The passivation layer 190 protects the recording section 160, and may be a Diamond Like Carbon (DLC) passivation layer. In this case, the DLC passivation layer enhances the surface hardness of the perpendicular type of magnetic recording medium 100. In addition, a lubricating layer (not shown) of a tetraol lubricant, or the like, may be formed on the passivation layer 190. Such a lubricating layer would minimize any abrasion of a magnetic head and the (DLC) passivation layer which may occur if the head is caused to slide along the recording medium 100.

Figure 5:
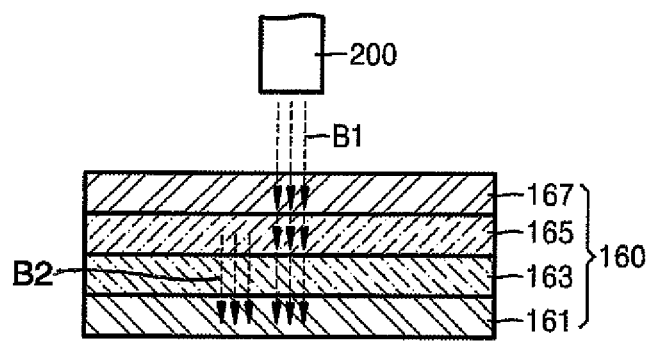
FIG. 5 is a conceptual diagram illustrating an operation of recording data on the recording section of the perpendicular magnetic type of recording medium of FIG. 1.

Hereinafter, a write operation of magnetically recording data on the perpendicular type of magnetic recording medium 100 will be described with reference to FIG. 5.

First, a writing pole of a magnetic head 200 emits a recording field B1, corresponding to information received by the head, toward the perpendicular type of magnetic recording medium 100. The recording field B1 has an intensity sufficient to reverse the magnetization of at least the middle ferro-magnetic layer 165, and may have an intensity sufficient to reverse the magnetization of the middle ferro-magnetic layer 165 and the upper ferro-magnetic layer 167.

More specifically, the direction of magnetization of magnetic grains of the middle ferro-magnetic layer 165 is reversed by the recording field B1, that is, the vectors of magnetic domains in the middle ferro-magnetic layer 165 are aligned in a predetermined direction with respect to each recorded bit. The middle ferro-magnetic layer 165 generates a magnetic field B2 and therefore, the magnetic field B2 contributes to the magnetization of the lower ferro-magnetic layer 161. That is, the magnetic field B2 generated by the middle ferro-magnetic layer 165 is added to the recording field B1 emitted from the writing pole of the magnetic head 200 so that the magnetization of the lower ferro-magnetic layer 161 by the magnetic head 200 is enhanced. Thus, although the lower ferro-magnetic layer 161 has a high coercive force Hc due to its high perpendicular magnetic anisotropy energy (Ku), the lower ferro-magnetic layer 161 may be magnetically reversed using a conventional magnetic head.

If the recording field B1 magnetically reverses only the middle ferro-magnetic layer 165, the upper ferro-magnetic layer 167 may also be magnetically reversed by an interaction between the recording field B1 and the magnetic field B2 that is generated by the middle ferro-magnetic layer 165.

Meanwhile, even though the middle ferro-magnetic layer 165 has a relatively low perpendicular magnetic anisotropy energy (Ku), the middle ferro-magnetic layer 165 is thermally stable due to the relatively high perpendicular magnetic anisotropy energy (Ku) of the lower ferro-magnetic layer 161.

Figure 6:
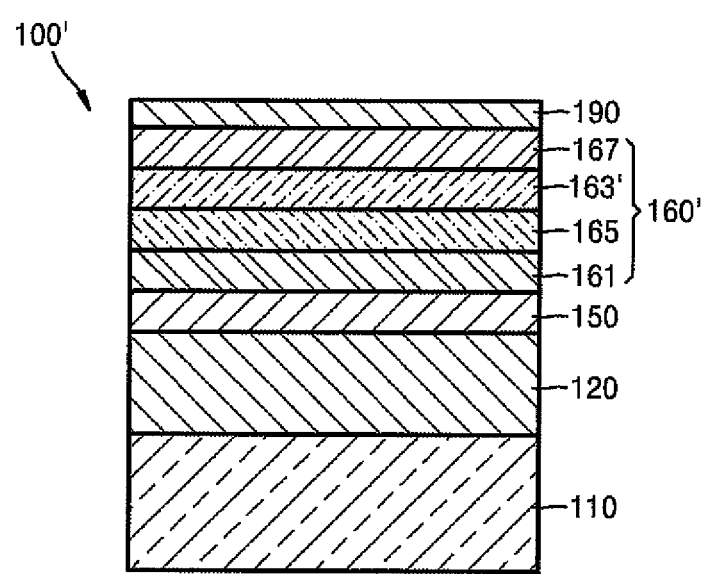
FIG. 6 is a cross-sectional view of another embodiment of a perpendicular type of magnetic recording medium according to the inventive concept.

FIG. 6 shows another embodiment of a perpendicular type of magnetic recording medium 100' according to the inventive concept.

Referring to FIG. 6, he perpendicular type of magnetic recording medium 100' has a substrate 110, a soft magnetic section 120, an intermediate section 150, a recording section 160', and a passivation layer 190 sequentially stacked one atop the other. The recording section 160' includes a plurality of ferro-magnetic layers, and a non-magnetic layer 163' interposed between respective ones of the ferro-magnetic layers.

The plurality of ferro-magnetic layers include a lower ferro-magnetic layer 161, a middle ferro-magnetic layer 165, and a upper ferro-magnetic layer 167 which are each formed of a Co alloy or a Co alloy oxide. The non-magnetic layer 163' may be formed of Ru or an Ru alloy. The lower ferro-magnetic layer 161, the middle ferro-magnetic layer 165, the upper ferro-magnetic layer 167, and the non-magnetic layer 163' of the embodiment of FIG. 6 are substantially the same as those of the embodiment of FIG. 1, except for the location of the non-magnetic layer 163'.

Instead, the non-magnetic layer 163' is interposed between the middle ferro-magnetic layer 165 and the upper ferro-magnetic layer 167. Thus, the lower ferro-magnetic layer 161 and the middle ferro-magnetic layer 165 directly contact each other so that they are magnetically coupled. Accordingly, the middle ferro-magnetic layer 165 is thermally stable due to the relatively high perpendicular magnetic anisotropy energy (Ku) of the lower ferro-magnetic layer 161 even when the magnetic grain size of the middle ferro-magnetic layer 165 is equal to or smaller than 6 nm.

Finally, embodiments of the inventive concept have been described herein in detail. The inventive concept may, however, be embodied in many different forms and should not be construed as being limited to the embodiments described above. Rather, these embodiments were described so that this disclosure is thorough and complete, and fully conveys the inventive concept to those skilled in the art. Thus, the true spirit and scope of the inventive concept is not limited by the embodiments described above but by the following claims.

What is claimed is:

1. An apparatus comprising:
a substrate; and
a recording section supported by the substrate comprising first and second ferro-magnetic layers and a non-magnetic layer, said first layer disposed between the substrate and the second layer and having a perpendicular magnetic anisotropy energy (Ku) greater than that of the second layer and a saturated magnetization (Ms) value greater than 500 emu/cc, the recording section having an overall saturated magnetization (Ms) value equal to or greater than 1000 emu/cc and having an overall perpendicular magnetic anisotropy energy (Ku) equal to or greater than $9\times10^6$ erg/cc.

2. The apparatus of claim 1, in which the non-magnetic layer is disposed between the first and second layers.

3. The apparatus of claim 1, in which the first and second layers each have an average magnetic grain size of about 6 nm.

4. The apparatus of claim 1, further comprising an intermediate section disposed on the substrate directly beneath the recording section, wherein the intermediate section is of material that affects the crystalline orientation of the recording section as it is formed on the intermediate section.

5. The apparatus of claim 4, further comprising a layer of soft magnetic material disposed between the substrate and the intermediate section.

6. The apparatus of claim 1, in which the first and second layers are each formed of a $(Co_{100-X}Cr_X)_{100-Y}Pt_Y$ alloy or $(Co_{100-X}Cr_X)_{100-Y}Pt_Y$ alloy oxide satisfying the relationships $0 \leq X \leq 5$ and $20 \leq Y \leq 30$, in which concentrations of X and Y are measured in at %.

7. The apparatus of claim 1, in which the perpendicular magnetic anisotropy energy (Ku) of the first layer is from $5\times10^6$ erg/cc to $5\times10^7$ erg/cc.

8. The apparatus of claim 1, in which the first and second layers are each formed of a $Co_{100-Y}Pt_Y$ alloy or $Co_{100-Y}Pt_Y$ alloy oxide satisfying the relationship $20 \leq Y \leq 30$ where concentration of Y is measured in at % and the overall perpendicular magnetic anisotropy energy (Ku) of the recording section is about $1.5\times10^7$ erg/cc.

9. The apparatus of claim 1, in which the perpendicular magnetic anisotropy energy (Ku) of the second layer is between about $3\times10^6$ erg/cc and about $5\times10^6$ erg/cc.

10. The apparatus of claim 1, in which the recording section further comprises a third ferro-magnetic layer having a saturated magnetization (Ms) greater than that of the second layer.

11. The apparatus of claim 1, in which both the first and second layers comprise Pt, the first layer having a greater percentage of Pt as compared to that of the second layer, and both layers having a percentage of Pt that is 20 at. % to 40 at. %.

12. An apparatus comprising:
a substrate; and
a recording section supported by the substrate comprising first, second and third ferro-magnetic layers and a non-magnetic layer between the first and third layers, the first layer disposed between the substrate and the second layer, the first layer having a saturated magnetization (Ms) value greater than 500 emu/cc and a perpendicular magnetic anisotropy energy (Ku) from $5\times10^6$ erg/cc to $5\times10^7$ erg/cc, each of the first, second and third layers formed of a common material with magnetic grains having an average size equal to or smaller than 9 nm.

13. The apparatus of claim 12, in which the first, second and third layers are each formed of a $Co_{100-Y}Pt_Y$ alloy or $Co_{100-Y}Pt_Y$ alloy oxide satisfying the relationship $20<Y<30$ where concentration of Y is measured in at. %. and an overall perpendicular magnetic anisotropy energy (Ku) of the recording section is about $1.5\times10^7$ erg/cc.

14. The apparatus of claim 12, in which the average size of the magnetic grains is about 6 nm.

15. The apparatus of claim 12, in which the third layer has a saturated magnetization (Ms) greater than that of the second layer.

* * * * *